Sept. 20, 1938.    A. C. HUSTON    2,130,586
FORMING ROLLER FOR TUBE WINDING MACHINES
Filed Feb. 18, 1936
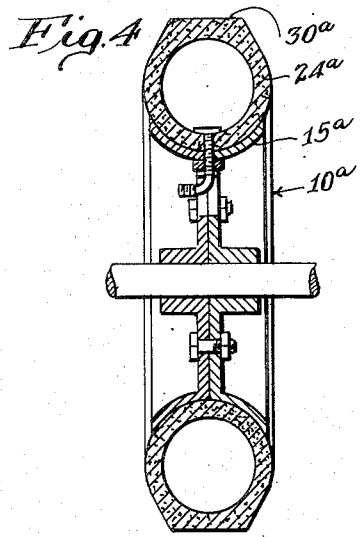
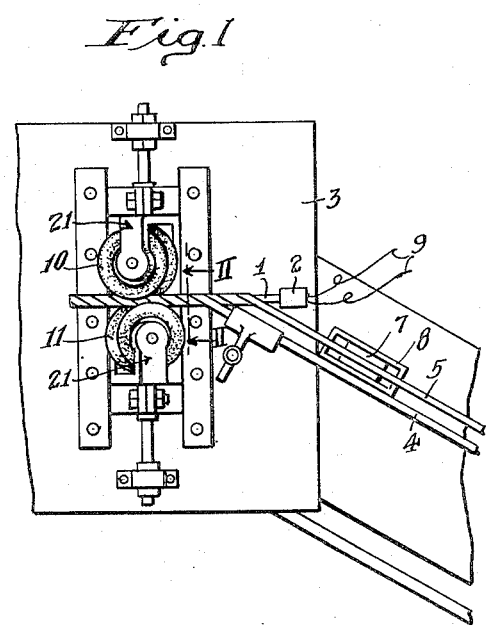
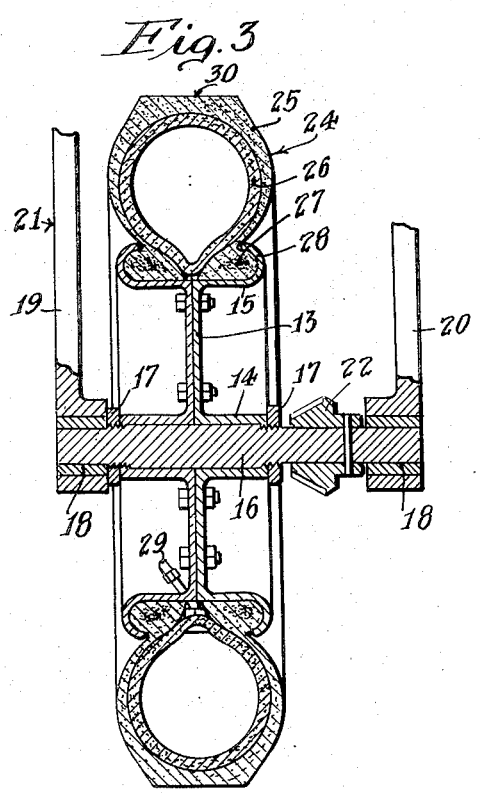
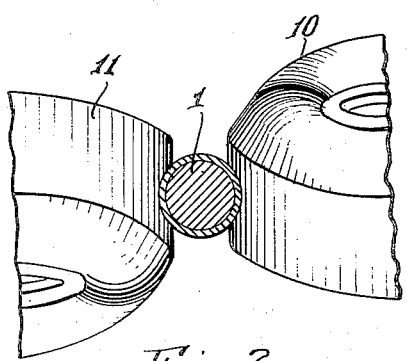
Inventor
Arch Charles Huston
By Lyon & Lyon
attorney Patented Sept. 20, 1938

2,130,586

UNITED STATES PATENT OFFICE 2,130,586

FORMING ROLLER FOR TUBE-WINDING MACHINES

Arch Charles Huston, Los Angeles, Calif.

Application February 18, 1936, Serial No. 64,509

2 Claims. (Cl. 93—80)

This invention relates to machines for winding or forming tubes from strips of paper or other flexible sheet material.

Tubing of the type to which the invention relates, whether it be for soda straws, mailing tubes, receptacles or other purposes, is made by helically winding one or more strips of paper, cardboard, "cellophane" or the like about a mandrel in overlapping relation and causing the overlapped surfaces to adhere together, as by coating one or more of the strips with a suitable adhesive before it is fed to the mandrel. As the tubing is formed it is moved along the mandrel and off one end thereof and cut into suitable lengths for use. To move the tubing along the mandrel there have been employed one or more rollers mounted diagonally with respect to the mandrel for bearing against the strip as the latter winds onto the mandrel. The rollers are positively rotated and function to feed the formed tubing along the mandrel and also to compress the material against the mandrel, thereby insuring thorough bonding of the overlapped layers and the production of smooth uniform tubing.

Heretofore, to the best of my knowledge, the tube-contacting faces of the rollers have been made of soft rubber to provide a surface capable of frictionally gripping the strip material and at the same time yielding slightly whereby it conforms, to a limited extent, to the curvature of the tubing and contacts the latter over an area instead of at only a single point, as would be the case if the roller surfaces were unyielding. (It must be borne in mind that in order to propel the formed tubing along the mandrel, the axes of the rollers must be angularly disposed with respect to the axis of the mandrel, and a rigid cylindrical roller can contact along a line only if the axis of the roller and the axis of the mandrel are parallel.)

An object of the present invention is to improve the efficiency of tube winding machines of the type described and I achieve this object by employing winding rollers, the tube-contacting rim portions of which consist of pneumatic tires having much greater resilience than can be obtained with solid rubber. As a result of the increased resilience obtained, the winding rollers simultaneously contact the tube surface over a much greater area while applying substantially the same unit pressure over all portions of the contact area, thereby producing more thorough bonding between the different layers of material and a more uniform surface on the finished tubing.

The manner in which the foregoing object is achieved, together with various specific features of the invention, will now be explained with reference to the following detailed description which refers to the drawing.

In the drawing:

Fig. 1 is a plan view of a portion of a winding machine incorporating forming rollers in accordance with the invention;

Fig. 2 is a detail view in the plane II—II of Fig. 1, showing the positioning of the rollers relative to the forming mandrel;

Fig. 3 is a detail cross section through one of the forming rollers; and

Fig. 4 is a detail cross sectional view through a modified form of roller incorporating my invention.

Tube-winding machines of the general type to which this invention relates may comprise a stationary mandrel 1 (Fig. 1) supported at one end on a suitable bracket 2 from a base or table 3 with means for continuously supplying strip material thereto and rollers for compressing the strip material against the mandrel and moving it along the mandrel and off the upper end thereof.

Fig. 1 discloses a machine for winding double thickness tubing and to this end two tapes of paper or the like 4 and 5, respectively, are fed to the mandrel 1 at an angle of approximately 45°, as shown. The particular apparatus for feeding the tape and for applying adhesive thereto is not shown in Fig. 1 since such elements do not constitute any part of the present invention and are well known in the art. Suffice it to say that the tape 5 which forms the inner layer of the tube may be coated on the top with adhesive and the tape 4 which forms the outer coating of the tube may have adhesive applied to its under side. Just before it reaches the mandrel the inner tape 5 may also be coated on its under side with a film of paraffin. Thus the tape passes over a roller 7 which dips into melted paraffin contained in a receptacle 8. The paraffin serves to water-proof the finishing tubing and also functions as a lubricant between the inner surface of the tubing and the mandrel 1 to facilitate movement of the tubing along and off the mandrel.

The mandrel 1 is preferably electrically heated by an internal heating element connected to leads 9 which may extend to any suitable source of electric current. The purpose of heating the mandrel is to melt the paraffin on the under side of the tape 5 and also to facilitate drying of the glue coating on the tapes which combines the two layers of a finished tube together.

A pair of rollers 10 and 11 are angularly disposed on opposite sides of the mandrel 1 and positioned to bear against and frictionally engage the strips 4 and 5 to press the same against the mandrel. The angularly disposed position of the rollers is such that the rotation of the rollers will wind the paper tapes about the mandrel while at the same time the frictional engagement between the rollers and the paper tapes will rotate the wound tapes about the stationary mandrel and feed the same forwardly along and off the end of the mandrel 1. The rollers 10 are preferably so disposed with respect to the mandrel that their planes extend substantially in the direction of the helically wound strips of tape which they contact. In other words, the axes of the rollers lie in planes substantially parallel to the axis of the mandrel but are each disposed at an angle to the axis of the mandrel. The axes of the rollers are preferably in parallel planes so that the rollers press the mandrel at diametrically opposite points. Each of the rollers 10 and 11 is positively rotated in such direction as to shift the tubing along the mandrel and off the free end thereof. The particular method of driving the rollers does not constitute a part of the invention. However, for purposes of explanation, it is assumed that the drive employed will be the same as that disclosed in United States Letters Patent No. 1,913,447 to A. C. Huston et al., in which each of the rollers is mounted upon a shaft carrying a bevel gear, which bevel gear is engaged by a driving gear rotated at the proper speed. As previously indicated, the present invention resides solely in the construction of the rollers 10 and 11.

Referring now to Fig. 3, each of the rollers 10 and 11 comprise a wheel member consisting of a disc portion 13 having formed therewith a hub 14 and a rim 15. The hub 14 is rigidly secured to a shaft 16 by nuts 17 threaded onto the shaft 16. Shaft 16 is rotatably supported in journals 18 in the ends of arms 19 and 20 which constitute the two arms of a yoke 21 (Fig. 1) anchored to the base 3 of the machine. The shaft 16 extends a substantial distance between the hub 14 and the arm 20 to provide room for a bevel gear 22 which is keyed to shaft 16 and is employed to rotate the latter as previously outlined.

The rim 15 of each roller 10 and 11 is adapted to support a hollow tire 24 which constitutes a resilient rim for contacting the tubing on the mandrel 1. The tire 24 may be constructed in various ways but a convenient construction is that shown in Fig. 3, in which the tire comprises a casing member 25 and an inner tube 26, the construction being substantially in accordance with standard automobile and double tube bicycle tire construction. Thus the casing 25 may be provided with beads 27 adapted to be engaged by the clincher edges 28 of the rim 15. The inner tube 26 may have a suitable valve fitting 29 connected thereto and extending through the rim 15 for inflating the tire.

Likewise the tread portion of the tire which contacts the tubing may be of various shapes. In Figs. 2 and 3 the tire is shown as having a substantially flat tread portion 30.

By virtue of the inherent elasticity of a pneumatic tire, the tread portion 30 yields readily and by mounting the rollers 10 and 11 with their rims in close proximity to each other but on opposite sides of the mandrel 1, the treads of the tires will be indented to hug the tubing on the mandrel tightly and extend over a substantial area of the tubing. The area of contact and the pressure of contact may be varied by adjusting the rollers toward and away from the mandrel and by varying the pressure of air within the tire. These adjustments make the rollers adaptable for use with many different tube-forming materials and for tubes meeting different requirements.

While I have illustrated my invention as employed for the winding of relatively small diameter tubes about a small diameter mandrel wherein two rollers on opposite sides of the mandrel are employed to mutually resist the forces exerted upon the mandrel by the rollers, it will be understood by those skilled in the art that in instances where the diameter of the tube is such that the mandrel may constitute a relatively inflexible body, a single roller may be employed for the winding and tube advancing operations. Likewise it will be understood that where desired more than two rollers may be employed disposed at equal distances about the mandrel, and my roller construction may be employed in machines embodying any number of rollers without requiring alteration of the particular roller construction.

It is also to be understood that the number of tapes of material employed in forming a tube has no relation to the construction of the rollers. The machine disclosed in Fig. 1 illustrates the manufacture of a two-ply tube in which one tape is wound directly upon the mandrel and a second tape upon the first tape. In some instances tubes may be wound from only a single strip of material or where greater strength and thickness is required three or more strips of material may be wound one on top of the other.

Likewise, although I prefer to employ air to inflate the tire, it is not essential that this particular gas be employed and in some instances where a very rigid roller surface is desired it may be found advisable to fill the tire with some liquid rather than with gas. Liquids being practically incompressible, the only yielding of the tread would then result from the natural resilience of the tread material.

While I have illustrated in Figs. 1 and 2 and 3, a form of my roller embodying the clincher type of tire of double tube construction employing an outer casing and an inner tube to be inflated, it will be understood by those skilled in the art that the same effects may be accomplished by employing a single tubular tire construction cemented to the rim of the wheel similar to that frequently employed in bicycle tires. This form of the invention is illustrated in Fig. 4, wherein the rim 15a of the roller 10a is provided with an exterior surface conforming with the inner cross sectional surface of the single tubular tire member 24a. Where a single tube tire is used it is preferable to form the tube with a cross section having a flattened exterior surface 30a to provide a greater area of contact between the tire surface and the tapes 4 and 5. Also it is preferable to form the outer portions of the tire of thicker cross sections than the inner portions of the tire which constitute the side walls and rear wall thereof in order to provide a greater wearing surface for presentation to frictional contact with the tapes 4 and 5.

Various minor departures from the detailed construction disclosed in the drawing may be made without departing from the invention, and the latter is to be limited only as set forth in the appended claims.

I claim:

1. A wrapping and compressing roller for a tube-forming machine of the class wherein tube material is wrapped and compressed about a mandrel by a resilient roller so positioned as to bear against and be indented by the tube material on the mandrel, said roller comprising a tube-contacting rim portion consisting of a hollow tire containing fluid under pressure whereby it applies substantially the same contact pressure to the tube material over the entire area of contact therewith.

2. A roller as described in claim 1 in which said tire, when not indented by the tube, has a substantially cylindrical tube-contacting surface whereby it is readily deformed when indented by the tube to contact the tube over a substantial area.

ARCH CHARLES HUSTON.